(12) United States Patent
Cheng

(10) Patent No.: US 6,357,641 B1
(45) Date of Patent: Mar. 19, 2002

(54) ACCESSORY HOLDER

(76) Inventor: Peter Cheng, 99 Glencairn Street, Toronto, Ontario (CA), M4R 1M7

( * ) Notice: Subject to any disclaimer, the term of this patent is extended or adjusted under 35 U.S.C. 154(b) by 0 days.

(21) Appl. No.: 09/496,106

(22) Filed: Feb. 1, 2000

(51) Int. Cl.[7] .............................................. B65D 25/10
(52) U.S. Cl. ...................... 224/242; 224/678; 224/679; 224/930
(58) Field of Search .................. 224/242, 241, 224/930, 240, 678, 679, 236; D3/218

(56) References Cited

U.S. PATENT DOCUMENTS 2,400,626 A * 5/1946 Brede ..................... 224/236 X
D294,081 S * 2/1988 Ito ................................ D3/33
4,775,083 A * 10/1988 Burger et al. ........... 224/242 X

* cited by examiner

*Primary Examiner*—Gregory M. Vidovich
*Assistant Examiner*—Maerena W. Brevard
(74) *Attorney, Agent, or Firm*—Kirschstein, et al.

(57) ABSTRACT

A holder for holding an accessory within ready access of a user, especially for belt-worn use, includes a resiliently deformable cover mounted on a container for inversion between a closed position in which the cover has a concave shape and resists removal of the accessory from the container, and an open position in which the cover has a convex shape and enables reception and removal of the accessory into and from the container. The cover is capable of self-maintaining the convex shape in the open position.

19 Claims, 2 Drawing Sheets

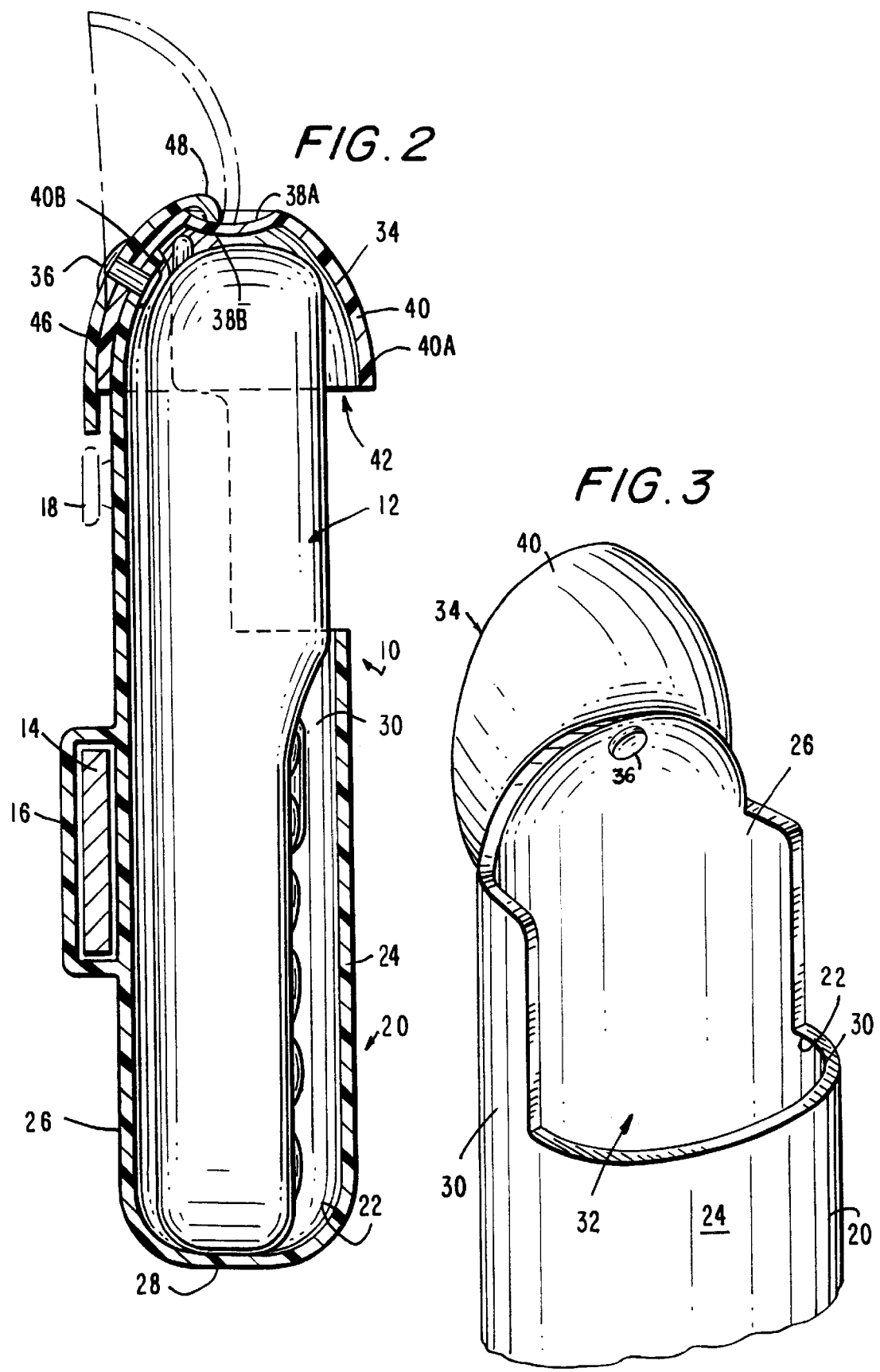

ACCESSORY HOLDER

BACKGROUND OF THE INVENTION

1. Field of the Invention

The present invention generally relates to a holder for holding an accessory within ready access of a user and, more particularly, to a user-wearable, carrying case that is easily opened and closed to receive and reliably store the accessory to be carried.

2. Description of the Related Art

Carrying cases or holders that enable a user to carry an accessory on a belt or other article of clothing are known in the art. The typical accessory is an item to which quick and easy access is required. For example, the accessory can be a cellular telephone which the user does not typically carry in one's pocket not only because its ring would be muffled, but also because its bulk can cause discomfort when the user sits down. Other accessories such as eyeglasses are also not best carried in one's pocket due to breakage problems. Still other accessories such as keys require ready access without requiring the user to hunt for the keys when needed. Holders exemplary of the art are disclosed in U.S. Pat. Nos. 4,071,065, 4,775,083, 5,988,577 and D-362,542.

SUMMARY OF THE INVENTION

OBJECTS OF THE INVENTION

The objects of this invention are to provide an accessory holder which can be worn on a user's belt or other article of clothing, which can easily and quickly provide access to the accessory being held, and which can reliably hold and protect the accessory without fear of loss or breakage.

FEATURES OF THE INVENTION

In keeping with the above objects and others which will become apparent hereinafter, one feature of the present invention resides, briefly stated, in a holder for holding an accessory. The holder includes a container having a compartment for receiving the accessory, and a resiliently deformable cover mounted on the container for inversion between a closed position in which the cover has a concave shape and overlies the compartment to resist removal of the accessory therefrom, and an open position in which the cover has a convex shape and enables reception and removal of the accessory into and from the compartment. When the cover is inverted to the open position, the cover maintains itself in the convex shape.

In the preferred embodiment, the holder is worn on a user's belt, or is attached to a button on the user's clothing, or is attached somewhere else on the user's clothing, or is attached to another item carried by the user such as a purse, wallet, or umbrella. The holder is supported in a region within ready access of the user.

Preferably, the container and the cover are spaced apart in the closed position to bound an opening through which the accessory is visible. The cover has a hemispherical, domed shape in the closed position and is manually turned inside out to assume the convex shape in the open position. The inverted cover remains turned inside out until the user manually urges the cover to its original domed, concave shape. To facilitate the inversion, an abutment is mounted on the cover and bears against a central region thereof. The central region of the cover is held in place while the rest of the cover is inverted. The cover is constituted of an elastic material such as rubber.

Thus, in the closed position, the dome-shaped cover overlies the compartment and protects the accessory therein, while simultaneously providing an opening through which the accessory is visible, or through which unmuffled sounds can be heard, or through which the user can grasp the accessory. In the open position, the inverted cover is turned inside out and is flipped up away from the compartment, thereby providing unimpeded access to the accessory therein. The inverted cover remains in the flipped-up state until the user manually inverts the cover to assume its original domed shape.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a sectional view taken on line 2—2 of FIG. 1; and

FIG. 3 is a perspective, broken-away view of the holder of FIG. 1, with the cover in an open, inverted position.

DETAILED DESCRIPTION OF THE PREFERRED EMBODIMENTS

Figure 1:
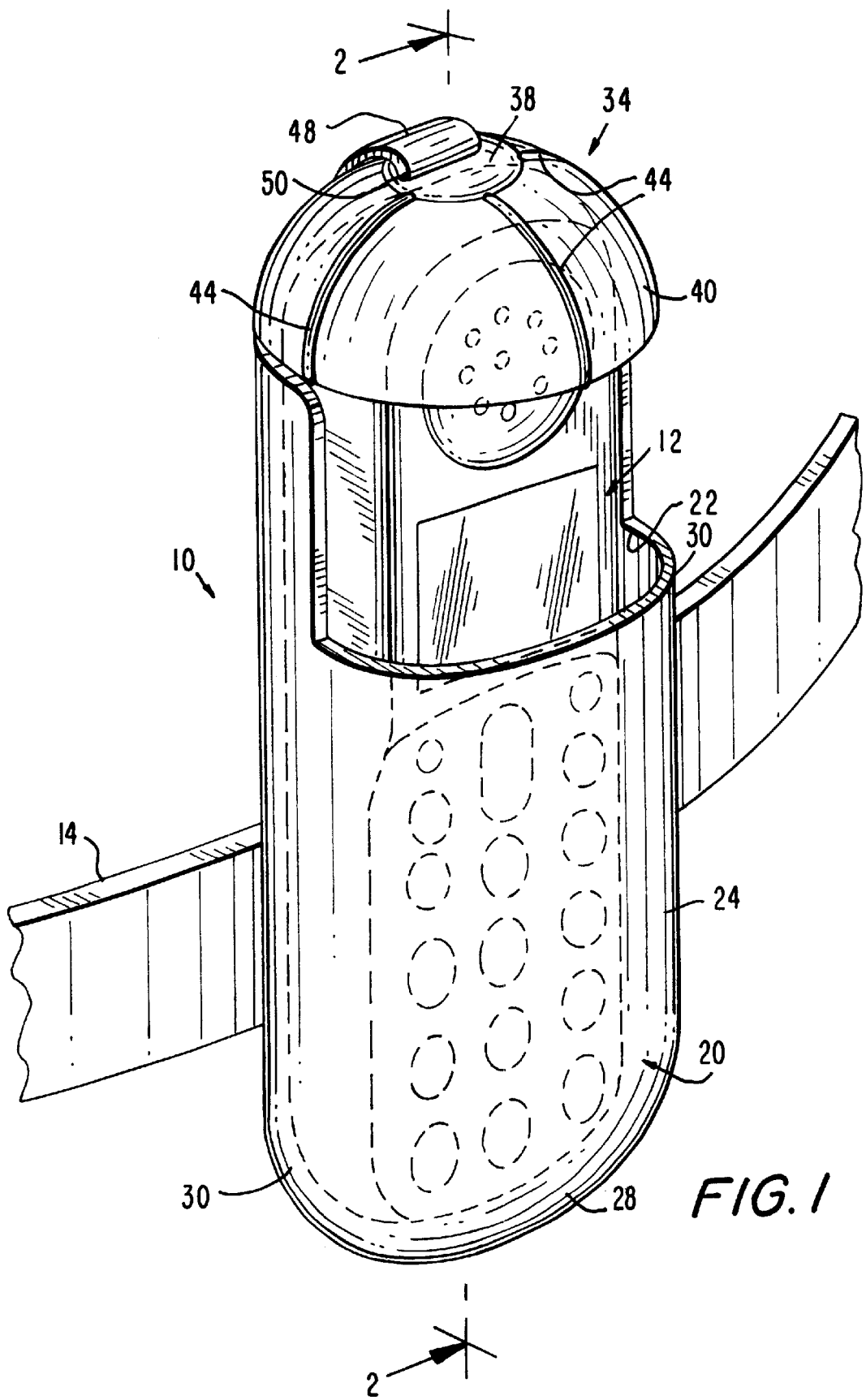
FIG. 1 is a perspective view of a holder with a cover in a closed position in accordance with this invention mounted on a belt shown in broken-away view.

Reference numeral 10 in FIG. 1 generally identifies a carrying case or holder for holding an accessory 12. The accessory 12 depicted in the drawing is a cellular telephone, but this is merely exemplary since virtually any item can be so held. For example, if the accessory is an electronic device, the item can be a pager, an organizer, a data assistant, or a computer. If the accessory is more personal in nature, the item can be a pack of cigarettes, a lighter, or eyeglasses. The accessory can be a functional item such as a tool, a wallet, a set of keys, or a camera. Other uses can be as a holster for holding a handgun. In brief, the holder is intended for items requiring reliable storage and easy and ready accessibility.

The holder 10 itself is supportable on diverse supports. In a preferred embodiment, the holder is supported on a belt 14 worn around a user's waist. As shown in FIG. 2, the belt is passed through a channel 16 on the back of the holder. The holder could equally well be clipped, or otherwise fastened, to the belt. As also shown in FIG. 2, a fastener 18 on the back of the holder can be employed to attach the holder to a button or a mating fastener provided on the user's clothing. Velcro™ fasteners are also contemplated. The back of the holder can be formed with a hole through which a support peg is inserted when it is desired to suspend the holder from the peg. Still other contemplated supports are purses or umbrellas on which the holder can be supported.

The holder 10 includes a container 20 having walls bounding a compartment 22 for receiving the accessory. The container has a front wall 24, a rear wall 26, a base wall 28, a pair of side walls 30, and an open top 32 through which the accessory 12 is inserted into, or removed from, the compartment 22. As illustrated, the rear wall 26 is longer along a vertical direction than the front wall 24.

A cover 34 is mounted on the rear wall 26 of the container for inversion between a closed position, as depicted in FIG.

1, in which the cover has a concave shape and resists removal of the accessory 12 from the compartment 22, and an open position, as depicted in FIG. 3, in which the cover has a convex shape and enables reception and removal of the accessory into and from the compartment 22. One or a plurality of fasteners 36 is used to attach the cover 34 to the rear wall.

In the closed position, the cover 34 has a hemispherical shape with a central circular region 38 that is preferably dish-shaped, and an outer domed region 40 that has an open bottom 42 that overlies the open top 32 of the compartment. The open bottom 42 and the open top 32 are spaced apart along the vertical direction and bound an opening through which the accessory is visible and accessible.

The cover is constituted of a resiliently deformable material, preferably elastic, such as a soft rubber, which returns to its original shape after being deformed. As shown in FIG. 1, a plurality of raised arch-shaped ribs 44 extend along an exterior surface of the domed region 40 from the open bottom 42 to the periphery of the circular region 38, and serve to reinforce the cover 34.

An elongated extension 46 is also mounted on the rear wall 26, preferably using the same fastener 36, and extends lengthwise along the rear wall 26 and extends over the exterior surface of a rear half 40B of the domed region 40, until the extension 46 terminates at a free end thereof in an abutment 48 that overlies a rear half 38B of the central circular region 38 of the cover. The abutment 48 bears against the semi-circular rear half 38B. The abutment 48 has a bearing edge 50 that extends diametrically across, and divides, the central region 38.

In the closed position, the extension helps to maintain the cover in the concave shape depicted in FIG. 1, in which the cover protects the accessory and surrounds the accessory at all its exposed sides. The cover also prevents the accessory from falling or dropping out of, or otherwise separating itself from, the holder, especially when the user-supported holder is in motion.

To remove the accessory, the cover 34 is inverted to the flipped-up, open position shown in dashed lines in FIG. 2 and in full lines in FIG. 3. The user manually urges a front half 40A of the domed region 40 and a front half 38A of the circular region 38 upwardly. During this upward movement, the rear half 40B of the domed region and the rear half 38B of the circular region 38 are held stationary by the extension 46. The bearing edge 50 acts as a fulcrum about which the cover inverts or turns inside out to the convex shape. The inverted cover surrounds the free end of the extension 46 and maintains itself upright, thereby granting free and full access to the compartment.

After the accessory has been received in the compartment, the front half 40A is manually urged downwardly until, having cleared the bearing edge 50, the front half 40A and the front half 38A automatically return due to their inherent resilience to their initial positions, thereby securely holding the accessory in place.

It will be understood that each of the elements described above, or two or more together, also may find a useful application in other types of constructions differing from the types described above.

While the invention has been illustrated and described as embodied in an accessory holder, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

I claim:

1. A holder for holding an accessory, comprising:
   a) a container for receiving the accessory when held; and
   b) a resiliently deformable cover mounted on the container for inversion between a closed position in which the cover has a concave shape and resists removal of the accessory from the container, and an open position in which the cover has a convex shape and enables reception and removal of the accessory into and from the container, the container and the cover being spaced apart in the closed position to bound an opening through which the accessory is visible, the cover self-maintaining the convex shape until inversion back to the closed position.

2. The holder according to claim 1, wherein the concave shape of the cover is a dome.

3. The holder according to claim 1, wherein the cover has a central region; and further comprising an abutment mounted on the container and engaging the central region during inversion from the closed to the open position.

4. The holder according to claim 3, wherein the central region is a circular zone, and wherein the abutment has a bearing edge which extends diametrically across the circular zone.

5. The holder according to claim 1; and further comprising a support for supporting the container within ready access of a user.

6. The holder according to claim 5, wherein the support is a loop through which a belt passes.

7. The holder according to claim 1, wherein the cover is constituted of an elastic material.

8. The holder according to claim 1, wherein the cover is a hemisphere in the closed position.

9. A holder for holding a personal accessory within ready access of a user, comprising:
   a) a container bounding a compartment for receiving the accessory;
   b) a resiliently deformable cover mounted on the container for inversion between a closed position in which the cover has a hemispherical, domed, concave shape overlying the compartment to resist removal of the accessory from the compartment, and a flipped-up, open position in which the cover has an inverted, convex shape remote from the compartment to enable reception and removal of the accessory into and from the container; and
   c) an abutment mounted on the container and bearing against the cover during inversion of the cover from the closed to the open position to facilitate said inversion, the cover surrounding the abutment in the open position and self-maintaining the convex shape in the open position.

10. The holder according to claim 9, wherein the container and the cover are spaced apart in the closed position to bound an opening through which the accessory is visible.

11. The holder according to claim 9; and further comprising a support for supporting the container within ready access of a user.

12. The holder according to claim 11, wherein the support is a loop through which a belt passes.

13. A holder for holding an accessory, comprising:
 a) a container for receiving the accessory when held and having a central region;
 b) a resiliently deformable cover mounted on the container for inversion between a closed position in which the cover has a concave shape and resists removal of the accessory from the container, and an open position in which the cover has a convex shape and enables reception and removal of the accessory into and from the container, the cover self-maintaining the convex shape until inversion back to the closed position; and
 c) an abutment mounted on the container and engaging the central region during inversion from the closed to the open position.

14. The holder according to claim 13, wherein the container and the cover are spaced apart in the closed position to bound an opening through which the accessory is visible.

15. The holder according to claim 13, wherein the concave shape of the cover is a dome.

16. The holder according to claim 13, wherein the central region is a circular zone, and wherein the abutment has a bearing edge which extends diametrically across the circular zone.

17. The holder according to claim 13; and further comprising a support for supporting the container within ready access of a user.

18. The holder according to claim 13, wherein the cover is constituted of an elastic material.

19. The holder according to claim 13, wherein the cover is a hemisphere in the closed position.

* * * * *